United States Patent
Yamato et al.

(10) Patent No.: US 10,031,543 B2
(45) Date of Patent: Jul. 24, 2018

(54) POWER MANAGEMENT SYSTEM AND REFRIGERATOR

(71) Applicant: Mitsubishi Electric Corporation, Tokyo (JP)

(72) Inventors: Yasunari Yamato, Tokyo (JP); Go Maeda, Tokyo (JP); Katsumasa Sakamoto, Tokyo (JP); Takashi Oishi, Tokyo (JP); Makoto Okabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 258 days.

(21) Appl. No.: 14/762,495

(22) PCT Filed: Feb. 4, 2014

(86) PCT No.: PCT/JP2014/052588
§ 371 (c)(1),
(2) Date: Jul. 22, 2015

(87) PCT Pub. No.: WO2014/156312
PCT Pub. Date: Oct. 2, 2014

(65) Prior Publication Data
US 2015/0355657 A1 Dec. 10, 2015

(30) Foreign Application Priority Data

Mar. 26, 2013 (JP) ................. 2013-063938

(51) Int. Cl.
*G05F 1/66* (2006.01)
*G05B 15/02* (2006.01)
(Continued)

(52) U.S. Cl.
CPC ............... *G05F 1/66* (2013.01); *F25D 29/00* (2013.01); *G05B 15/02* (2013.01); *H02J 3/14* (2013.01);
(Continued)

(58) Field of Classification Search
CPC .... G05F 1/66; G05B 15/02; H02J 3/14; H02J 2003/143; H02J 13/0006; F25D 29/00;
(Continued)

(56) References Cited

U.S. PATENT DOCUMENTS

| | | |
|---|---|---|
| 2011/0175742 A1 | 7/2011 | Shin et al. |
| 2012/0023987 A1 | 2/2012 | Besore et al. |
| 2013/0025303 A1 | 1/2013 | Yoon et al. |

FOREIGN PATENT DOCUMENTS

| | | |
|---|---|---|
| JP | H07-305935 A | 11/1995 |
| JP | H11-296771 A | 10/1999 |

(Continued)

OTHER PUBLICATIONS

Prymek et al., "Priority-Based Smart Household Power Control Model", 2012 IEEE.*

(Continued)

*Primary Examiner* — Carlos Ortiz Rodriguez
(74) *Attorney, Agent, or Firm* — Posz Law Group, PLC (57) ABSTRACT

A power management system includes a plurality of electric devices including a refrigerator, and a centralized controller configured to control the plurality of electric devices. The centralized controller includes difficulty determination means configured to determine power supply difficulty as a degree of difficulty in supplying power to the plurality of electric devices. Meanwhile, the refrigerator includes: a control setting table in which a plurality of power reduction controls that reduce use of power are stored to be associated with the power supply difficulty; reduction control setting means configured to set the power reduction control to be executed, by using the control setting table and the power supply difficulty determined by the difficulty determination (Continued)

means; and a device controller configured to perform the power reduction control set by the reduction control setting means.

7 Claims, 6 Drawing Sheets

(51) Int. Cl.
*F25D 29/00* (2006.01)
*H02J 3/14* (2006.01)
*H02J 13/00* (2006.01)

(52) U.S. Cl.
CPC ..... *H02J 13/0006* (2013.01); *H02J 2003/143* (2013.01); *Y02B 70/3225* (2013.01); *Y02B 70/3266* (2013.01); *Y02E 60/74* (2013.01); *Y04S 10/30* (2013.01); *Y04S 20/222* (2013.01); *Y04S 20/242* (2013.01)

(58) Field of Classification Search
CPC ...... Y04S 10/30; Y04S 20/242; Y04S 20/222; Y02B 70/3225; Y02B 70/3266; Y02E 60/74
See application file for complete search history.

(56) References Cited

FOREIGN PATENT DOCUMENTS

| JP | 2009-278796 A | 11/2009 |
|----|---------------|---------|
| JP | 2010-193705 A | 9/2010 |
| JP | 2012-518819 A | 8/2012 |
| WO | 2006/126495 A1 | 11/2006 |

OTHER PUBLICATIONS

Extended European Search Report dated Oct. 26, 2016 issued in corresponding EP patent application No. 4776348.6.
Japanese Office Action dated Oct. 4, 2016 in the corresponding JP application No. 2013-063938. (English translation attached).
International Search Report of the International Searching Authority dated May 13, 2014 for the corresponding international application No. PCT/JP2014/052588 (and English translation).
Office Action dated Feb. 4, 2017 in the corresponding Chinese Patent Application No. 201480018137.8 (English translation attached).
Communication pursuant to Article 94(3) EPC dated Sep. 8, 2017 in the corresponding EP Patent Application No. 14776348.6.

\* cited by examiner

| POWER SUPPLY INFORMATION ED | POWER GENERATION STATE OF SOLAR POWER GENERATION PANEL PV | POWER USE STATE EU | POWER SUPPLY DIFFICULTY SD |
|---|---|---|---|
| NO PROBLEM | LARGE AMOUNT | SMALL AMOUNT | 0 |
| | | LARGE AMOUNT | 1 |
| | SMALL AMOUNT | SMALL AMOUNT | 1 |
| | | LARGE AMOUNT | 2 |
| PEAK CUT | LARGE AMOUNT | SMALL AMOUNT | 3 |
| | | LARGE AMOUNT | 3 |
| | SMALL AMOUNT | SMALL AMOUNT | 3 |
| | | LARGE AMOUNT | 4 |
| PLANNED BLACKOUT | LARGE AMOUNT | SMALL AMOUNT | 5 |
| | | LARGE AMOUNT | 5 |
| | SMALL AMOUNT | SMALL AMOUNT | 5 |
| | | LARGE AMOUNT | 6 |
| BLACKOUT | LARGE AMOUNT | SMALL AMOUNT | 7 |
| | | LARGE AMOUNT | 7 |
| | SMALL AMOUNT | SMALL AMOUNT | 7 |
| | | LARGE AMOUNT | 8 |

FIG. 6

| CONTENTS OF POWER REDUCTION CONTROLS | | POWER CONSUMPTION REDUCTION EFFECT | BURDEN ON USER |
|---|---|---|---|
| CONTROL A | ECO MODE | SMALL | SMALL |
| CONTROL B | ICE-MAKING STOP | SMALL | INTERMEDIATE |
| CONTROL C | REFRIGERATOR INTERIOR LIGHTING DEVICE EXTINCTION | SMALL | INTERMEDIATE |
| CONTROL D | RAPID COOLING AVOIDANCE | INTERMEDIATE | INTERMEDIATE |
| CONTROL E | RAPID ICE-MAKING AVOIDANCE | INTERMEDIATE | INTERMEDIATE |
| CONTROL F | DEFROST AVOIDANCE | INTERMEDIATE | GREAT |
| CONTROL G | COMPRESSOR ROTATION SPEED LIMIT | GREAT | GREAT |
| CONTROL H | STORAGE COMPARTMENT SHIFT-UP | GREAT | GREAT |

POWER MANAGEMENT SYSTEM AND REFRIGERATOR

CROSS REFERENCE TO RELATED APPLICATIONS

This application is a U.S. national stage application of International Patent Application No. PCT/JP2014/052588, filed on Feb. 4, 2014, which is based on Japanese Patent Application No. 2013-063938, filed on Mar. 26, 2013, the contents of which are incorporated herein by reference.

TECHNICAL FIELD

The present invention relates to a power management system that reduces power to be used by an electric device, and a refrigerator.

BACKGROUND

In recent years, from the standpoint of protection of global environment, there has been increasing interest in energy saving, and a power management system such as HEMS (HOME ENERGY MANAGEMENT SYSTEM) that manages power per house has attracted attention (e.g., see Patent Literature 1). Patent Literature 1 discloses that when a measured current value does not decrease to a predetermined current before elapse of a predetermined time after exceeding a preset warning reference quantity, power supply to predetermined load devices is individually cut, thereby preventing power supply to all the load devices from being cut simultaneously by a current limiter or a breaker due to overuse of electricity.

PATENT LITERATURE

Patent Literature 1: Japanese Unexamined Patent Application Publication No. 11-296771

A refrigerator is an electric device, which is desired to continuously operate to cool and store food. When power supply to a refrigerator is also cut similarly to the other electric devices as in Patent Literature 1, the disadvantage increases.

SUMMARY

The present invention has been made to solve the above-described problem, and an object of the present invention is to provide a power management system that reduces power consumption without stopping power supply to an electric device such as a refrigerator, which is desired to continuously operate; and a refrigerator.

A power management system according to the present invention includes: a plurality of electric devices including a refrigerator; and a centralized controller configured to control the plurality of electric devices. The centralized controller includes difficulty determination means configured to determine power supply difficulty indicating a degree of difficulty in supplying power to the plurality of electric devices, and the refrigerator includes: a control setting table in which contents of a plurality of power reduction controls that reduce use of power are stored to be associated with the power supply difficulty; reduction control setting means configured to set the plurality of power reduction controls by using the control setting table and the power supply difficulty determined by the difficulty determination means; and a device controller configured to perform the plurality of power reduction controls set by the reduction control setting means. According to the power management system of the present invention, when information that informs that it is difficult to supply power to the entire system is received, the power reduction control at the refrigerator is selected and executed in accordance with the power supply difficulty, thereby reducing power consumption without turning off the refrigerator. Thus, it is possible to handle the power supply difficulty without impairing comfort for the user in a range where it is possible to supply power.

DETAILED DESCRIPTION

Embodiment 1

Figure 1:
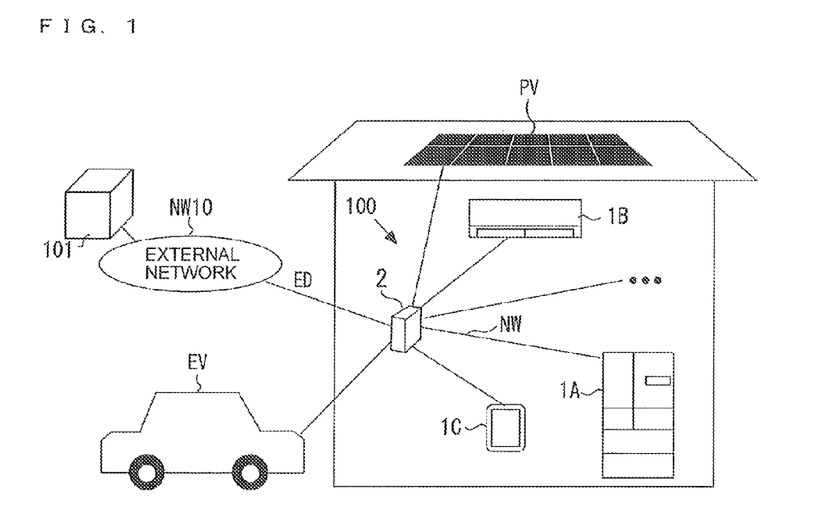
FIG. 1 is a system configuration diagram showing Embodiment 1 of a power management system of the present invention.

Hereinafter, an embodiment of a refrigerator of the present invention will be described with reference to the drawings. FIG. 1 is a system configuration diagram showing Embodiment 1 of a power management system of the present invention, and a power management system 100 will be described with reference to FIG. 1. The power management system 100 in FIG. 1 manages power, for example, of a plurality of electric devices 1A to 1C installed in a house (HEMS: HOME ENERGY MANAGEMENT SYSTEM). The plurality of electric devices 1A to 1C is connected to a centralized controller 2 via a wire or a wireless network NW. In addition, the centralized controller 2 is connected to an external network NW10, and is configured to be able to acquire power supply information ED indicating a power supply state, for example, from an electric power company 101.

Here, examples of the plurality of electric devices connected to the centralized controller 2 include a refrigerator 1A, an air-conditioning device 1B, and an installation-type or tablet-type information terminal device (interface device) 1C. Among them, the centralized controller 2 is also connected to the installation-type or tablet-type information terminal device 1C, and a user is allowed to confirm a power use state or operate each device by using the information terminal device 1C. The electric devices 1A to 1C connected to the centralized controller 2 are not limited to the above types, and devices such as a water heater, a lighting device, and a television may be connected thereto.

In particular, the power management system 100 cooperates with an electric vehicle EV and a solar power generation panel PV, and power generated in the solar power generation panel PV is supplied to the plurality of electric devices 1A to 1C and is stored in a storage battery of the electric vehicle EV. In addition, at the time of a blackout due to a disaster or the like or at the time of a social request of power saving, the power stored in the storage battery of the electric vehicle EV is supplied to the plurality of electric devices 1A to 1C. In this case, the centralized controller 2 has a function of adjusting a power load in a household based on power generation/charge states of the solar power generation panel PV and the electric vehicle EV.

Figure 2:
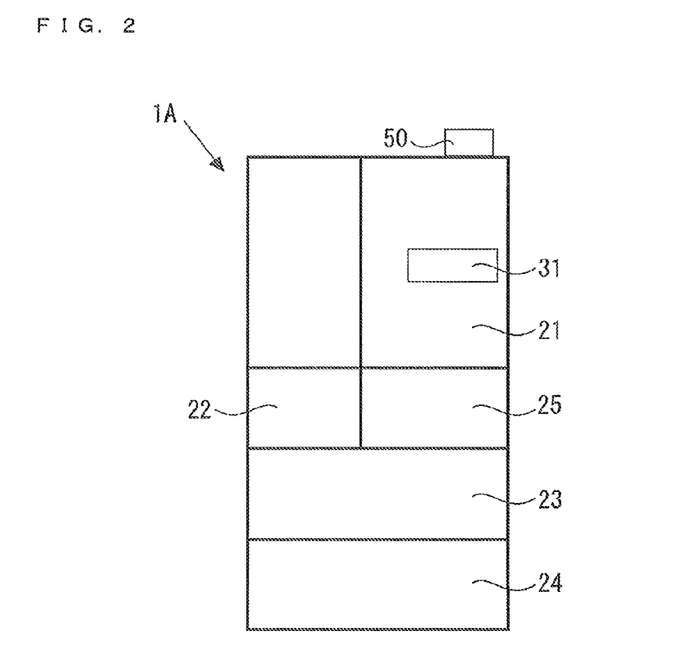
FIG. 2 is a schematic front view showing Embodiment 1 of a refrigerator of the present invention.
Figure 3:
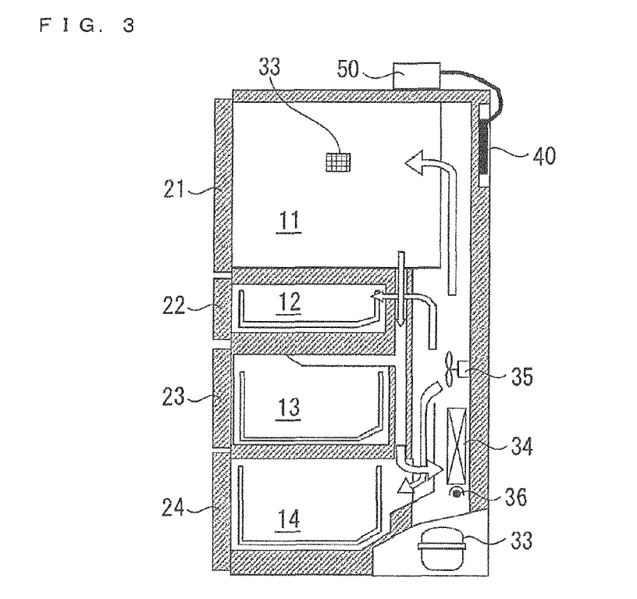
FIG. 3 is a schematic cross-sectional view of Embodiment 1 of the refrigerator of the present invention.

FIG. 2 is a schematic front view showing Embodiment 1 of the refrigerator of the present invention, FIG. 3 is a schematic cross-sectional view of Embodiment 1 of the refrigerator of the present invention, and the refrigerator 1A will be described with reference to FIGS. 2 and 3. The refrigerator 1A includes a refrigerating compartment 11 provided at the uppermost stage, and a plurality of storage compartments 12 to 14 provided below the refrigerating compartment 11. A door 21 is disposed at the front of the refrigerating compartment 11, and doors 22 to 25 are disposed at the front of the respective storage compartments 12 to 14. An operation panel 31, which is operated by the user, is provided at the door 21 of the refrigerating compartment 11, and the user is allowed to adjust set temperatures for the refrigerating compartment 11 and the storage compartments 12 to 14 or instruct rapid cooling or the like by operating the operation panel 31. In addition, each of the refrigerating compartment 11 and the storage compartments 12 to 14 is provided with a door switch (not shown), which detects opening/closing of the door. If opening of the door 21 at the refrigerating compartment 11 is detected, a refrigerator interior lighting device 32 in the refrigerating compartment 11 is lit up.

The refrigerator 1A has a refrigeration cycle for cooling and circulating air and includes a compressor 33, a cooler 34, and an air-sending fan 35. The compressor 33 compresses refrigerant to be sent to the cooler 34, and the cooler 34 exchanges heat between the refrigerant compressed by the compressor 33 and air to cool air in the refrigerator. The air-sending fan 35 circulates the air cooled by the cooler 34 from an air passage to the refrigerating compartment 11 and the storage compartments 12 to 14. A damper (not shown) that is able to open and close is provided in the air passage, and is opened or closed based on a temperature detected by an indoor temperature sensor (not shown) provided at each compartment to adjust the temperature in each compartment. In addition, a heater 36 for melting frost on the cooler 34 is mounted at a lower portion of the cooler 34, and a cover is provided between the cooler 34 and the heater 36 to prevent melted water from directly pouring on the heater 36.

The refrigerator 1A further includes a controller 40, which is provided at the back side thereof and controls operation of the refrigerator 1A, and information transmission means 50 for the controller 40 to transmit data to and receive data from the outside. The controller 40 is composed of a micro controller such as a DSP, and each actuator and each sensor in the refrigerator 1A are connected thereto. The controller 40 controls various operations of the refrigerator 1A such as start and stop of the compressor 33 and the air-sending fan 35 and opening and closing of the damper provided in the air passage leading to each compartment, based on input of the temperature detected by each temperature sensor. The information transmission means 50 is composed of, for example, a communication adapter, and various data is transmitted and received between the centralized controller 2 and the controller 40 via the information transmission means 50.

Figure 4:
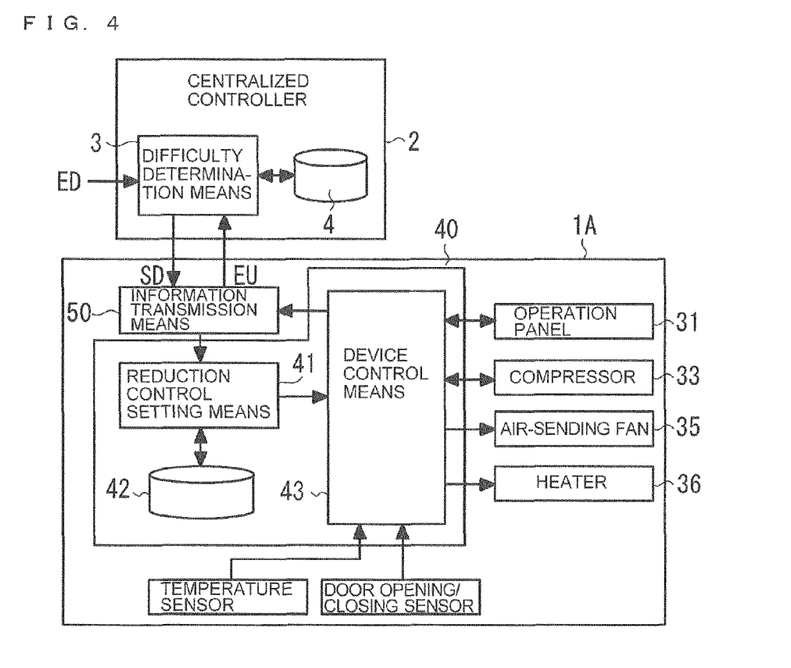
FIG. 4 is a functional block diagram showing an example of the power management system in FIG. 1.

The above-described controller 40 has a function of performing power reduction control in accordance with the degree of power supply difficulty. FIG. 4 is a functional block diagram showing an example of the centralized controller 2 and the controller 40 of the refrigerator 1A, and the centralized controller 2 and the controller 40 of the refrigerator 1A will be described with reference to FIGS. 1 to 4. The centralized controller 2 includes difficulty determination means 3 and a difficulty determination table 4. The difficulty determination means 3 determines power supply difficulty SD indicating the degree of difficulty in supplying power to the plurality of electric devices 1A to 1C. Specifically, the difficulty determination means 3 determines the power supply difficulty SD based on the power supply information ED, a power use state EU, and a power generation state of the solar power generation panel PV. At that time, the difficulty determination means 3 acquires the power supply information ED transmitted from, for example, the electric power company 101 via the external network NW10 (see FIG. 1). In addition, the difficulty determination means 3 acquires the power use state EU from each of the electric devices 1A to 1C, and also acquires the power generation state from the solar power generation panel PV. Then, the centralized controller 2 determines the power supply difficulty SD by using the difficulty determination table 4 based on the power supply information ED acquired from the external network NW10 and the power use states of the electric devices 1A to 1C.

Figure 5:
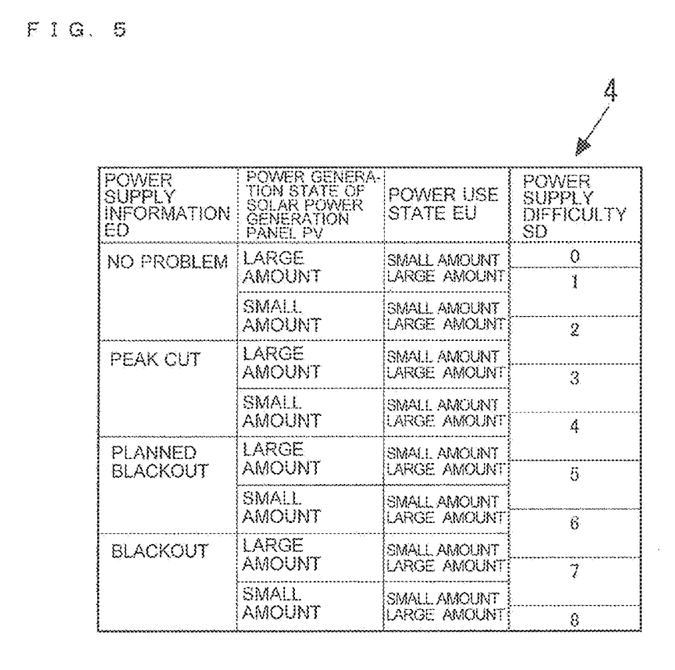
FIG. 5 is a diagram showing an example of a difficulty determination table in FIG. 4.

FIG. 5 is a schematic diagram showing an example of the difficulty determination table 4 in FIG. 4. The power supply difficulty SD in FIG. 5 is set stepwise from "0" to "8", and a higher number indicates a state where it is more difficult to supply power. In the difficulty determination table 4, the power supply difficulty SD is stored to be associated with the power supply information ED, the power use state EU, and the power generation state. For example, when the power supply information ED is categorized to "no problem", the amount of power generated by the solar power generation panel PV is categorized to "large amount", and the power use state EU is categorized to "small amount", the power supply difficulty SD is set at "0" at which there is no problem about power supply. In addition, when the power supply information ED is categorized to "blackout", the power generation state of the solar power generation panel PV is categorized to "small amount", and the power use state EU is categorized to "large amount", the power supply difficulty SD is set at "8" at which power supply is tight. The magnitudes of the power use state EU and the power generation state are categorized, for example, through thresholding.

In FIG. 5, the power supply difficulty SD="0" to "8" is set based on the three conditions of the power supply information ED, the power generation state, and the power use state EU, but may be set based on one or more of the three conditions, or may be set based on another condition (such as a charge state to the electric vehicle EV) in addition to the three conditions. In addition, the power supply difficulty SD is distinguished into 9 levels of "0" to "8", but suffices to be able to be made different between the time of normal use and the time of emergency, and the number of levels suffices to be 2 or more.

Meanwhile, the controller 40 of the refrigerator 1A in FIG. 4 has a function of selecting and executing a power reduction control in accordance with the power supply difficulty SD determined by the centralized controller 2. The above-described power supply difficulty SD may be automatically transmitted from the centralized controller 2 via the network NW to the refrigerator 1A, or may be transmitted when the user operates the information terminal device 1E. Furthermore, a transmission method may be changed based on the level of the power supply difficulty SD such that, for example, in the case where the above-described power supply difficulty SD is "0" to "5", the centralized controller 2 automatically transmits the power supply difficulty SD to the plurality of electric devices 1A to 1C, and in the case where the power supply difficulty SD is "6" to "8", the power supply difficulty SD is transmitted through an operation of the user.

The controller 40 includes reduction control setting means 41, a control setting table 42, and a device controller 43. The reduction control setting means 41 sets power reduction controls A to H to be executed from the control setting table 42 by using the power supply difficulty SD determined by the difficulty determination means 3. Here, in the control setting table 42, priorities of a plurality of the power reduction controls A to H are set in accordance with the power supply difficulty SD, and the reduction control setting means 41 sets the priorities of the plurality of the power reduction controls A to H in accordance with the power supply difficulty SD.

Figure 6:
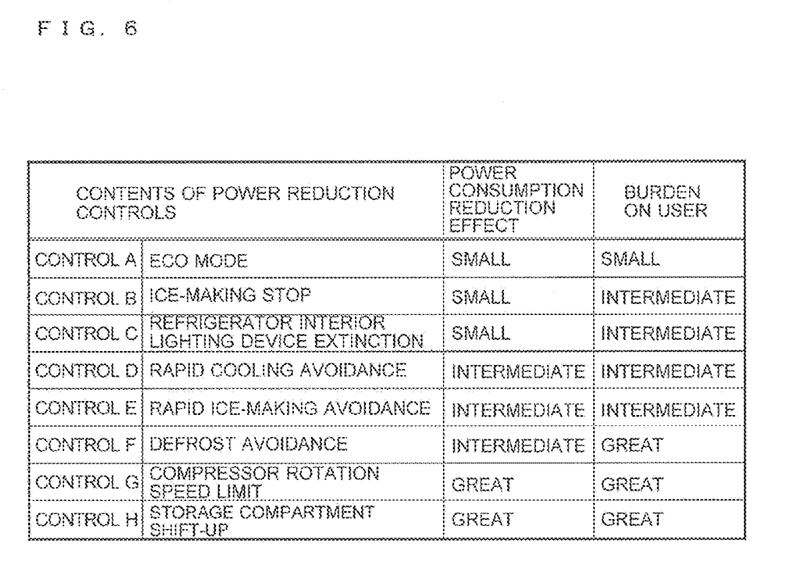
FIG. 6 is a table showing a ratio of a power consumption reduction effect and a burden on a user in each power reduction control.
Figure 7:
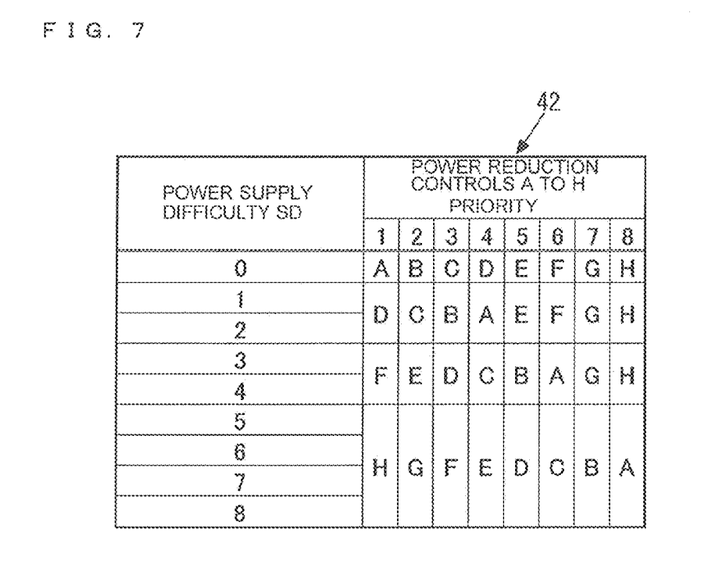
FIG. 7 is a schematic diagram showing an example of the data structure of a control setting table in FIG. 4.

FIG. 6 is a table indicating a ratio of a power consumption reduction effect and a burden on the user in each of the power reduction controls A to H, and FIG. 7 is a schematic diagram showing an example of the data structure of the control setting table 42. As shown in FIGS. 6 and 7, in the control setting table 42, the power reduction controls A to H that reduce power use of the refrigerator 1A are set, and priority patterns each of which specifies an order in which the power reduction controls A to H are performed are stored to be associated with the power supply difficulty SD. Hereinafter, the contents of the respective power reduction controls A to H will be individually described.

The power reduction control A (eco mode): eco mode is a power reduction control in which the use state of the refrigerator is determined based on an opening/closing sensor for each door and each temperature sensor, and if the frequency of use is low, the set temperature for each storage compartment is increased slightly (by about 2 K) to suppress wasted cooling to reduce the power consumption. The power reduction control A is a control in which the temperatures in the storage compartments 12 to 14 are increased, but the temperatures are increased based on the use state of the refrigerator at timing of a low frequency of use within a range where there is no influence on food storage, and thus there is almost no burden on the user.

The power reduction control B (ice-making stop): ice-making stop is a power reduction control in which a function of automatically making ice is stopped to reduce cold air (capacity) required for making ice. The power reduction control B is a control in which it is impossible to automatically make ice, and a burden is put on the user who desires to use ice, but in a situation such as in winter where ice is not used, there is almost no burden on the user.

The power reduction control C (refrigerator interior lighting device extinction): refrigerator interior lighting device extinction is a power reduction control in which even if opening of the door 21 at the refrigerating compartment 11 is detected, the refrigerator interior lighting device 32 is not lit up. The power reduction control C is a control in which even if the door 21 at the refrigerating compartment 11 is opened, since the refrigerator interior lighting device 32 is not lit up, visibility in the refrigerating compartment 11 is decreased, and thus there is no influence on storage/cooling of food but a burden is put on the user.

The power reduction control D (rapid cooling avoidance): rapid cooling avoidance is a power reduction control in which a rapid cooling function, which is settable in the operation panel 31, cannot be set. When the rapid cooling function is started, it is possible to rapidly decrease the temperature in the storage compartment by increasing the rotation speed of the compressor 33 and also decreasing the set temperature for the storage compartment. However, the power consumption increases, and thus it is possible to prevent an increase in the power consumption by making the rapid cooling function unsettable.

The power reduction control E (rapid ice-making avoidance): rapid ice-making avoidance is a power reduction control in which a rapid ice-making function, which is settable in the operation panel 31, cannot be set. When rapid ice-making is started, it is possible to shorten a time taken to make ice, by increasing the rotation speed of the compressor 33 and also decreasing the set temperature for the storage compartment 12 (ice-making compartment). However, similarly to the rapid cooling function, the power consumption increases, and thus it is possible to prevent an increase in the power consumption by making the rapid ice-making unsettable.

The above-described rapid cooling function and rapid ice-making function are additional merit functions, which are set in the operation panel 31. For the user who does not use the rapid cooling function or the rapid ice-making function, there is almost no burden on the user when the power reduction control D or the power reduction control E is executed. However, for the user who routinely uses the rapid cooling and the rapid ice-making, the power reduction control D and the power reduction control E are controls that put a burden on the user.

The power reduction control F (defrost avoidance): defrost avoidance function is a power reduction control in which a heater (not shown) for melting frost on the cooler 34 is not energized. When a large amount of frost is formed on the cooler 34, the cooling capacity decreases, and thus the frost on the cooler 34 is normally melted by heating of the heater once every about 1 to 2 days. However, extra power for energizing the heater is consumed. The heater is not energized or the timing of energizing the heater is extended to once every 3 to 4 days, whereby it is possible to prevent an increase in the power consumption, although the cooling capacity decreases.

The power reduction control G (compressor control): compressor rotation speed limit function is a power reduction control in which, of a plurality of rotation speeds of the compressor 33, the compressor 33 is prohibited from rotating at a high rotation speed. Normally, if the frequency of use of the refrigerator 1A is high or if the food load is high, the rotation speed of the compressor 33 is increased to increase the cooling capacity. The higher the rotation speed is, the greater the power consumption is. When the frequency of use is high or the food load is high and when the rotation speed is not increased, the cooling capacity decreases, but it is possible to prevent an increase in the power consumption. The upper limit of the rotation speed may be changed depending on the power supply difficulty. For example, when the power supply difficulty is low, the eighth level of the ten levels of the rotation speed may be the upper limit, and when the power supply difficulty is high, the sixth level of the ten levels may be the upper limit.

The power reduction controls F and G are controls in which the cooling capacity is decreased. Even if the storage compartment is desired to be cooled, it may be impossible to cool the storage compartment to a target set temperature due to insufficient cooling capacity. Thus, a large burden is put on the user, for example, the storage life of food is shortened, and, in the worst case, frozen food is melted.

The power reduction control H (storage compartment temperature control): storage compartment temperature shift-up is a power reduction control in which a set temperature for each of the storage compartments 12 to 14 is made higher than a normally set temperature. Since the power reduction control H is a control in which the set temperature for each of the storage compartments 12 to 14 is made higher than the normally set temperature, the power reduction control H is a control in which the burden on the user is very great, for example, the storage life of food is shortened and frozen food is melted. Normally, operation is performed at a set temperature corresponding to food stored in each compartment, such as a freezing compartment: about −18 degrees C. and the refrigerating compartment: about 3 degrees C. By increasing the set temperature, the required cooling capacity is reduced, and thus it is possible to reduce the power consumption. The amount by which the set temperature is increased may be variable depending on the power supply difficulty SD. The set temperature may be changed, for example, when the power supply difficulty SD is low, the freezing compartment may be set at about −15 degrees C., and when the power supply difficulty SD is high, the freezing compartment may be set at about −12 degrees C. In addition, if the power supply is really tight, normally, the temperature in each of the storage compartments 12 and 13 (such as an ice making compartment and the freezing compartment) in which food is stored in a frozen state may be in a refrigerating temperature range (0 degrees C. or higher), or a state where it is possible to store food without decaying the food, although the food cannot be stored in a frozen state, may be enabled to continue for a long period of time. Moreover, the storage compartment for which the temperature shift-up is performed may be changed depending on the power supply difficulty SD, for example, when the power supply is low, the temperature shift-up may be performed only for the refrigerating compartment 11, and when the power supply difficulty SD is high, the temperature shift-up may be performed for all the storage compartments 12 to 14.

As described above, of the power reduction controls A to H, for the control in which the power consumption reduction effect is smaller, the burden on the user is lower, and for the control in which the power consumption reduction effect is greater, the burden on the user is higher. In the control setting table 42, the priorities are set such that when the power supply difficulty SD is low, the degree of reducing the power consumption is reduced to decrease the burden on the user. On the other hand, the priorities are set such that when the power supply difficulty SD is high, the burden on the user increases but the power consumption reduction effect is increased. Since the power reduction controls A to H for the refrigerator 1A are set in accordance with the power supply difficulty SD as described above, the power consumption is reduced without turning off the refrigerator 1A, and thus it is possible to handle the power supply difficulty without stopping storage or cooling of food.

The power reduction controls A to H are an example of control for reducing the power consumption, and all the power reduction controls A to H may not be provided, or another control having a power consumption reduction effect may also be provided. In addition, the orders of the priorities are not limited to the orders in FIG. 7 as long as the priorities are set in accordance with the power supply difficulty SD. The priorities are set such that the power supply difficulty SD, the power reduction effect, and the degree of the burden on the user are balanced, for example, in the case where the power supply difficulty SD="1" or "2", the priorities may be changed from FIG. 7 to high: C→B→A→D→E→F→G→H: low.

The device controller 43 in FIG. 4 performs the power reduction controls A to H, which are set by the reduction control setting means 41. Thus, when the necessity to reduce the power consumption occurs, the reduction control setting means 41 sets the power reduction controls A to H in the order of the priorities of the plurality of power reduction controls A to H, and the device controller 43 sequentially performs the set power reduction controls A to H. For example, in the case where the power supply difficulty SD="0", the device controller 43 initially and sequentially performs the power reduction control A set by the reduction control setting means 41. Then, for example, if the power consumption is reduced to a target amount at the time when the power reduction controls A to D have been performed, the device controller 43 does not execute the power reduction controls E to H.

In addition, the device controller 43 has a function of detecting the power use state EU in the entire refrigerator 1A and outputting the power use state EU to the information transmission means 50. The information transmission means 50 transmits the power use state via the network NW to the centralized controller 2, and the centralized controller 2 determines the power supply difficulty SD based on the power use state EU transmitted from the refrigerator 1A and the power use state EU transmitted from each electric device such as the other air-conditioning device 1B and the information terminal device 1C (see FIG. 5).

Figure 8:
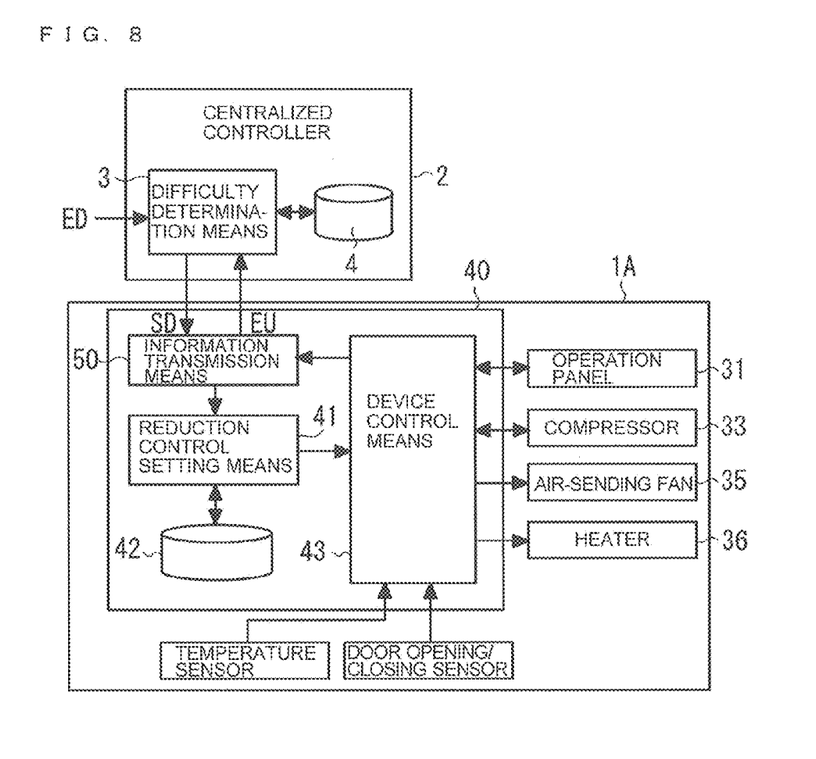
FIG. 8 is a functional block diagram showing a modification example of the power management system in FIG. 4.

In FIG. 4, the controller 40 and the information transmission means 50 are separately provided, but as shown in FIG. 8, the information transmission means 50 may be provided in the controller 40. In the case where the controller 40 and the information transmission means 50 are separate from each other as in FIG. 4, by providing the information transmission means 50 to only the user who uses the power management system 100, it is possible to produce the controller 40 at low cost. In addition, in the case where the information transmission means 50 is configured such that a communication circuit is provided in the controller 40 as in FIG. 8, the unit cost of the controller 40 increases, but it is possible to use the power management system 100 without mounting another component outside the refrigerator 1A.

Figure 9:
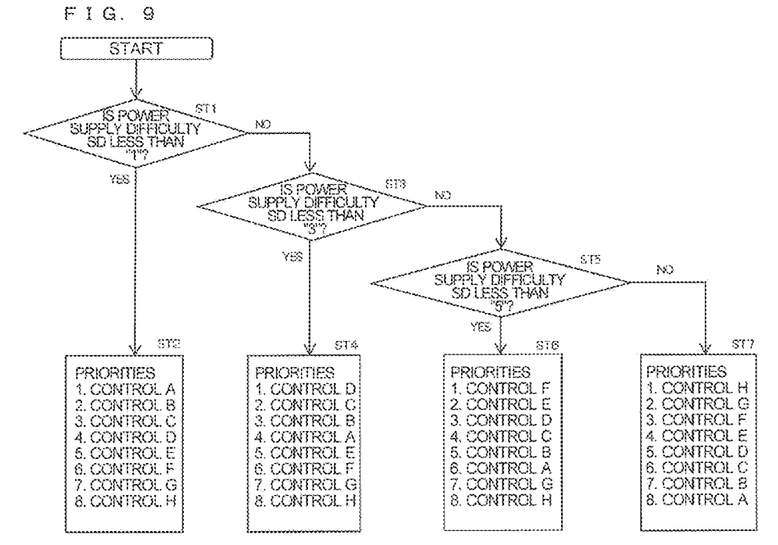
FIG. 9 is a flowchart showing an operation example of the power management system in FIG. 4.

FIG. 9 is a flowchart showing an operation example of the power management system 100 and the refrigerator 1A in FIG. 4, and the operation example of the power management system 100 and the refrigerator 1A will be described with reference to FIGS. 1 to 9. First, the power supply difficulty SD is calculated, for example, at every predetermined period in the centralized controller 2. Then, the power supply difficulty SD is transmitted from the centralized controller 2 via the network NW to the refrigerator 1A. Thereafter, in the reduction control setting means 41 of the controller 40, the priorities of the power reduction controls A to H are set in accordance with the power supply difficulty SD.

Specifically, if the power supply difficulty SD is less than "1" (step ST1), the priorities of the respective power reduction controls, which reduce the power consumption, are set as high: A→B→C→D→E→F→G→H: low (step ST2). If the power supply difficulty SD is equal to or higher than "1" and less than "3" (step ST3), the priorities are set as high: D→C→B→A→E→F→G→H: low (step ST4). If the power supply difficulty is equal to or higher than "3" and less than "5" (step ST5), the priorities are set as high: F→E→D→C→B→A→G→H: low (step ST6). If the power supply difficulty SD is equal to or higher than "5", the priorities are set as high: H→G→F→E→D→C→B→A: low (step ST7). FIG. 9 shows the case where the determination is performed in the ascending order of the power supply difficulty SD, but as long as priorities corresponding to the power supply difficulty SD are set, the order thereof is any order.

Since the priorities of the power reduction controls A to H, which reduce the power consumption, are changed in accordance with the power supply difficulty SD in the refrigerator 1A as described above, if the power supply difficulty SD is low, the control in which the power consumption reduction effect is small but the burden on the user is low is preferentially performed, and if the degree of the power supply difficulty is high, the control in which the power consumption reduction effect and the burden on the user are great is performed. Thus, it is possible to perform operation of the refrigerator 1A that suits the power supply state without stopping storage or cooling of food.

In the case of the configuration in which the power supply difficulty SD is transmitted from the centralized controller 2 to the refrigerator 1A by a users operation of the information terminal device 1C, control in which a burden is put on the user is not automatically performed without the user having a concern. Thus, even when information on the power supply difficulty is transmitted over the external network NW10, it is possible to select whether to execute the control in accordance with the power situation for each user.

Embodiment 2

Figure 10:
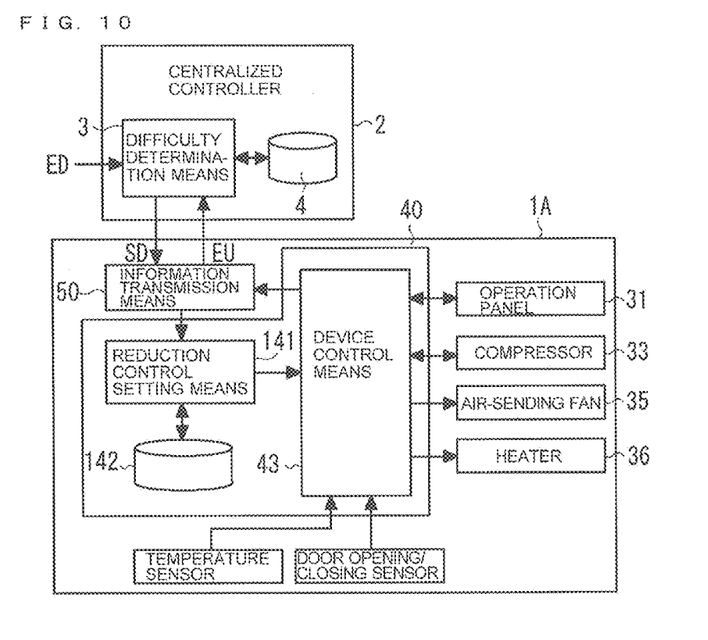
FIG. 10 is a functional block diagram showing Embodiment 2 of the power management system and the refrigerator of the present invention.

FIG. 10 is a functional block diagram showing Embodiment 2 of the power management system and the refrigerator of the present invention, and a controller 140 will be described with reference to FIG. 10. In the controller 140 in FIG. 10, the portions having the same configuration as the controller 40 in FIG. 4 are designated by the same reference signs, and the description thereof is omitted. In addition, FIG. 10 illustrates the case where the controller 40 and the information transmission means 50 are separately provided, but the information transmission means 50 may be provided in the controller 40 (see FIG. 8). The difference of the controller 140 in FIG. 10 from the controller 40 in FIG. 4 is that reduction control setting means 141 sets an executable control that is executable by using the power supply difficulty SD and a control setting table 142.

Figure 11:
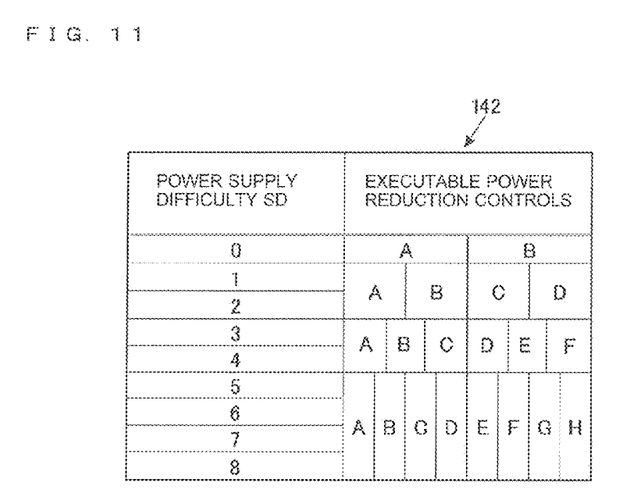
FIG. 11 is a schematic diagram showing an example of a control setting table in FIG. 10.

Specifically, the reduction control setting means 141 sets an executable control of the plurality of power reduction controls A to H by using the power supply difficulty SD and the control setting table 142, and the device controller 43 executes the power reduction control set by the reduction control setting means 141. Here, FIG. 11 is a schematic diagram showing an example of the control setting table 142 in FIG. 10. In the control setting table 142 in FIG. 11, the contents of executable controls of the plurality of power reduction controls A to H are set for each power supply difficulty SD. In the control setting table 142, setting is made such that the number of executable controls of the power reduction controls A to H increases as the power supply difficulty SD increases.

Figure 12:
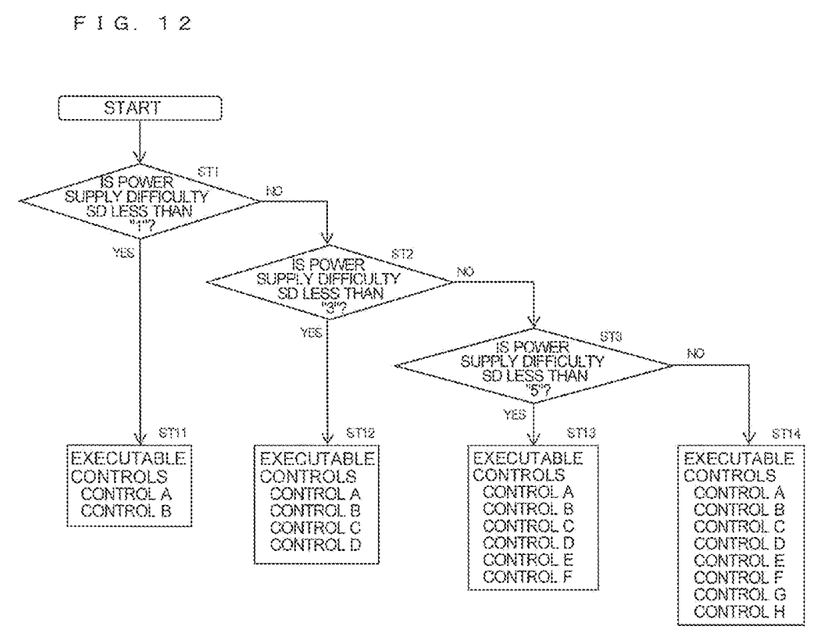
FIG. 12 is a flowchart showing an operation example of the power management system in FIG. 10.

FIG. 12 is a flowchart showing an operation example of the refrigerator 1A in FIG. 10, and the operation example of the refrigerator 1A will be described with reference to FIGS. 10 to 12. If the power supply difficulty SD is less than "1" (step ST1), it is determined that it is during normal use, and the executable power reduction controls are set as the "power reduction controls A and B" (step ST11). In addition, if the power supply difficulty SD is equal to or higher than "1" and less than "3" (step ST2), the executable power reduction controls are set as the "power reduction controls A, B, C, and D" (step ST12). If the power supply difficulty SD is equal to or higher than "3" and less than "5" (step ST3), the executable power reduction controls are set as the "power reduction controls A, B, C, D, E, and F" (step ST13). If the power supply difficulty SD is equal to or higher than "5", all the power reduction controls A to H are set as being executable (step ST14).

FIG. 12 illustrates the case where the power supply difficulty SD is categorized to "1", "3", and "5" for the executable reduction controls, but the executable reduction controls may be categorized to the time of normal use and the time of emergency or may be categorized to each power supply difficulty SD. In addition, which power reduction control is set as being executable at the time of the power supply difficulty SD is not limited to the case shown in FIG. 11. For example, even if the power supply difficulty SD is less than "1", the executable power reduction controls may be set as the "power reduction controls A, B, C, D, and E", and the executable controls may be set based on balance between the power supply difficulty SD, the power reduction effect, and the degree of burden on the user.

As described above, even when the executable power reduction controls A to H are selected in accordance with the power supply difficulty SD, if the power supply difficulty SD is low, only the control in which a burden is not put on the user is executed, and if the power supply difficulty SD is high, the control in which a burden is put on the user but the power consumption reduction effect is high is also made executable. Thus, it is possible to execute operation of the refrigerator that matches a power supply state.

In addition, in the case of the configuration in which the power supply difficulty SD is transmitted from the centralized controller 2 to the refrigerator 1A by a user's operation of the information terminal device 1C, it is possible to select whether to execute the control in accordance with the power situation for each user without freely executing the control in which a burden is put on the user.

The invention claimed is:

1. A power management system comprising:
a plurality of electric devices including a refrigerator; and
a centralized controller configured to control the plurality of electric devices,
the centralized controller including
a difficulty determination table in which a power supply difficulty indicating a degree of difficulty in supplying power to the plurality of electric devices is associated with power supply information externally acquired and indicating a state of power supply, power use states of the plurality of electric devices, and a power generation state of a solar power generation panel, and
a difficulty determination unit configured to
acquire the power supply information, the power use states, and the power generation state, and determine the power supply difficulty by using the difficulty determination table, the refrigerator including a control setting table in which contents of a plurality of power reduction controls that reduce use of power are stored to be associated with the power supply difficulty, a reduction control setting unit configured to set the plurality of power reduction controls by using the control setting table and the power supply difficulty determined by the difficulty determination unit, and a device controller configured to perform the plurality of power reduction controls set by the reduction control setting unit.

2. The power management system of claim 1, wherein in the control setting table, priorities of the plurality of power reduction controls are set in accordance with the power supply difficulty, the reduction control setting unit sets the priorities of the plurality of power reduction controls in accordance with the power supply difficulty, and the device controller performs the plurality of the power reduction controls in accordance with the priorities set by the reduction control setting unit.

3. The power management system of claim 1, wherein in the control setting table, an executable control of the plurality of power reduction controls is set for each level of the power supply difficulty, the reduction control setting unit sets the executable control of the plurality of power reduction controls in accordance with the power supply difficulty, and the device controller executes the plurality of power reduction controls set by the reduction control setting unit.

4. The power management system of claim 1, wherein the centralized controller determines the power supply difficulty by using information that is externally acquired and indicates the state of power supply to all the plurality of electric devices.

5. The power management system of claim 1, wherein the centralized controller acquires the power use states of the plurality of electric devices and determines the power supply difficulty by using the power use states.

6. The power management system of claim 1, wherein the plurality of electric devices includes an information terminal device that allows a user to view information managed by the centralized controller, and inputs and outputs the information, and information indicating that it is difficult to supply power is transmitted to the refrigerator by operating the information terminal device by a user.

7. A refrigerator that is connected to a centralized controller that is configured to control a plurality of electric devices and includes a difficulty determination table in which a power supply difficulty indicating a degree of difficulty in supplying power to the plurality of electric devices is associated with power supply information externally acquired and indicating a state of power supply, power use states of the plurality of electric devices, and a power generation state of a solar power generation panel and a difficulty determination unit configured to acquire the power supply information, the power use states, and the power generation state and determine the power supply difficulty by using the difficulty determination table, the refrigerator comprising:

a control setting table in which contents of a plurality of power reduction controls that reduce use of power are stored to be associated with the power supply difficulty;

a reduction control setting unit configured to set the plurality of power reduction controls by using the control setting table and the power supply difficulty determined by the difficulty determination unit; and a device controller configured to perform the plurality of power reduction controls set by the reduction control setting unit.

* * * * *